United States Patent [19]

Sanderson et al.

[11] 4,320,003
[45] Mar. 16, 1982

[54] BYPASS WATER CONDITIONER

[75] Inventors: Charles H. Sanderson; Charles W. Sanderson, both of Fort Wayne, Ind.

[73] Assignee: Kemtune, Inc., Fort Wayne, Ind.

[21] Appl. No.: 223,695

[22] Filed: Jan. 9, 1981

[51] Int. Cl.$^3$ .................. B01D 35/06; C02B 1/00
[52] U.S. Cl. ................................................ 210/222
[58] Field of Search .................. 210/222, 223, 195.1

[56] References Cited

U.S. PATENT DOCUMENTS

| | | |
|---|---|---|
| 1,673,837 | 6/1928 | Lotz .................................. 210/222 |
| 2,690,842 | 10/1954 | Spluvak . |
| 3,228,868 | 1/1966 | Ruskin . |
| 3,669,274 | 6/1972 | Happ et al. |
| 3,923,660 | 12/1975 | Kottmeier ......................... 210/222 |
| 3,951,807 | 4/1976 | Sanderson . |
| 4,050,426 | 9/1977 | Sanderson . |
| 4,146,479 | 3/1979 | Brown . |
| 4,153,559 | 5/1979 | Sanderson . |

Primary Examiner—John Adee
Attorney, Agent, or Firm—Gust, Irish, Jeffers & Hoffman

[57] ABSTRACT

A device for the magnetic treatment of liquids, particularly water, wherein a bypass chamber is provided so that only a portion of the liquid passing through the conditioner is subjected to the magnetic field. The device comprises one or more elongated magnetic cores each having an elongated magnet encased within a tubular inner casing of non-magnetic material. The magnetic core is received within an elongated intermediate casing of magnetic material, such as an iron or steel galvanized pipe, and being radially spaced therefrom so as to form a generally annular treatment chamber having an inlet at one end and an outlet at the opposite end. The intermediate casing, since it is formed of a magnetic material, provides a return path for the magnetic field produced by the magnet to confine the magnetic field substantially to the treatment chamber. An outer casing encircles the intermediate casing and is spaced from the intermediate casing around at least a portion of the periphery of the intermediate casing to form therebetween a bypass chamber having an inlet and an outlet. The bypass and treatment chambers are arranged such that they form respective parallel flow paths for the liquid flowing through the conditioner whereby a portion of the liquid flows through the treatment chamber and is treated by the magnetic field and the remainder of the liquid flows through the bypass chamber and is not subjected to the magnetic field. The device is particularly adapted to be connected in water system wherein a major portion of the water is recirculated continuously through the conditioner so that only a small portion of the water need be treated at any one time.

12 Claims, 10 Drawing Figures

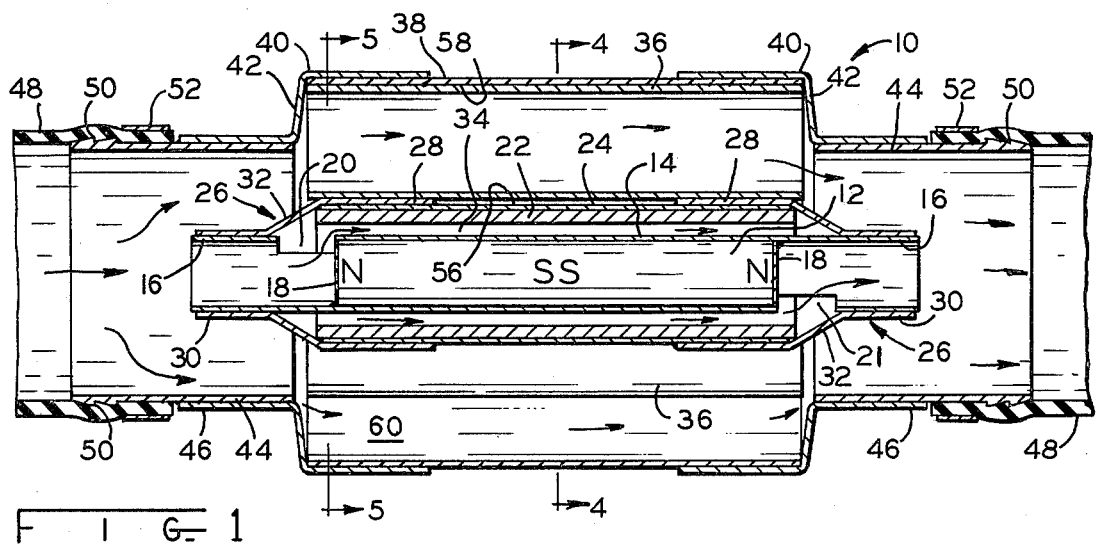
FIG. 1
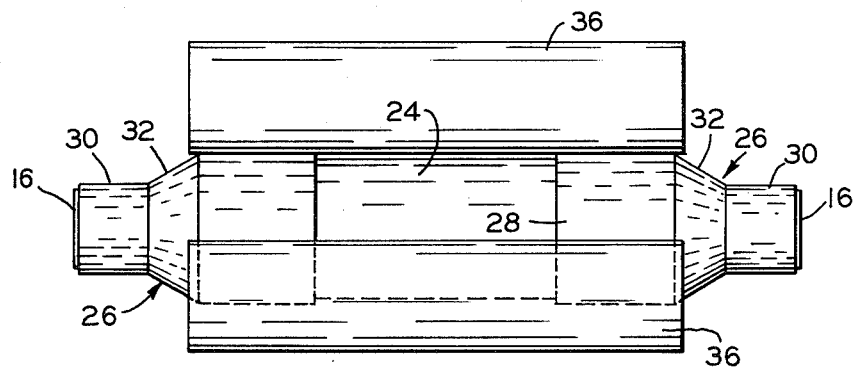
FIG. 2
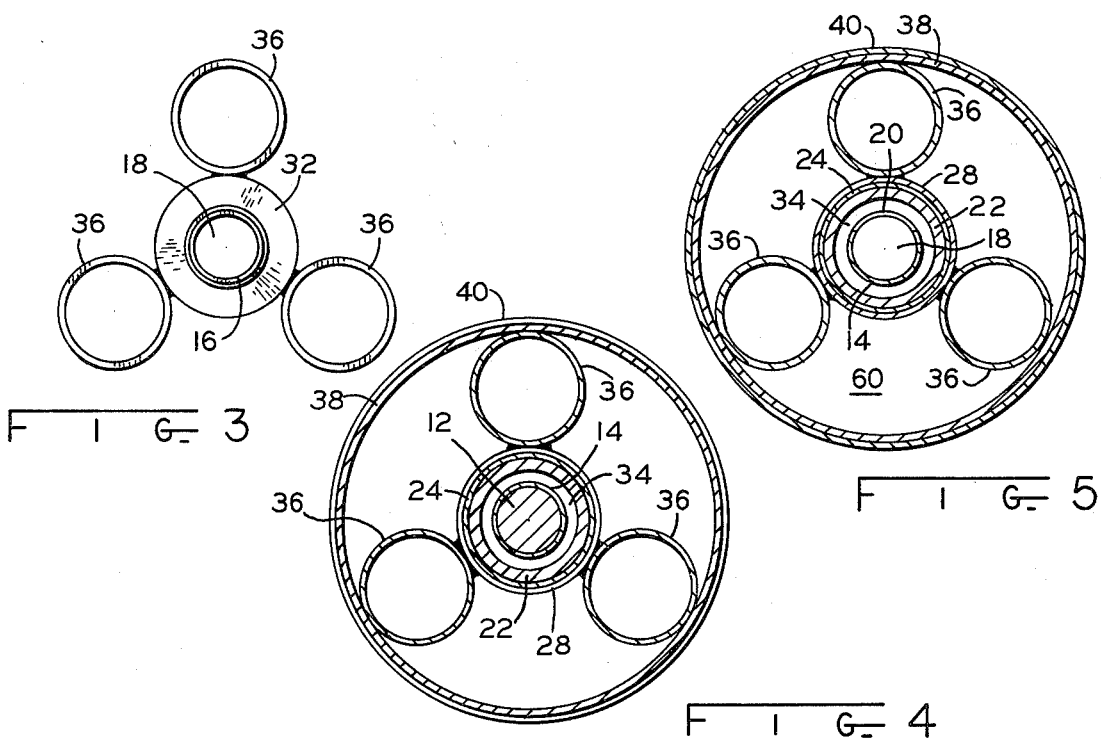
FIG. 3
FIG. 4
FIG. 5

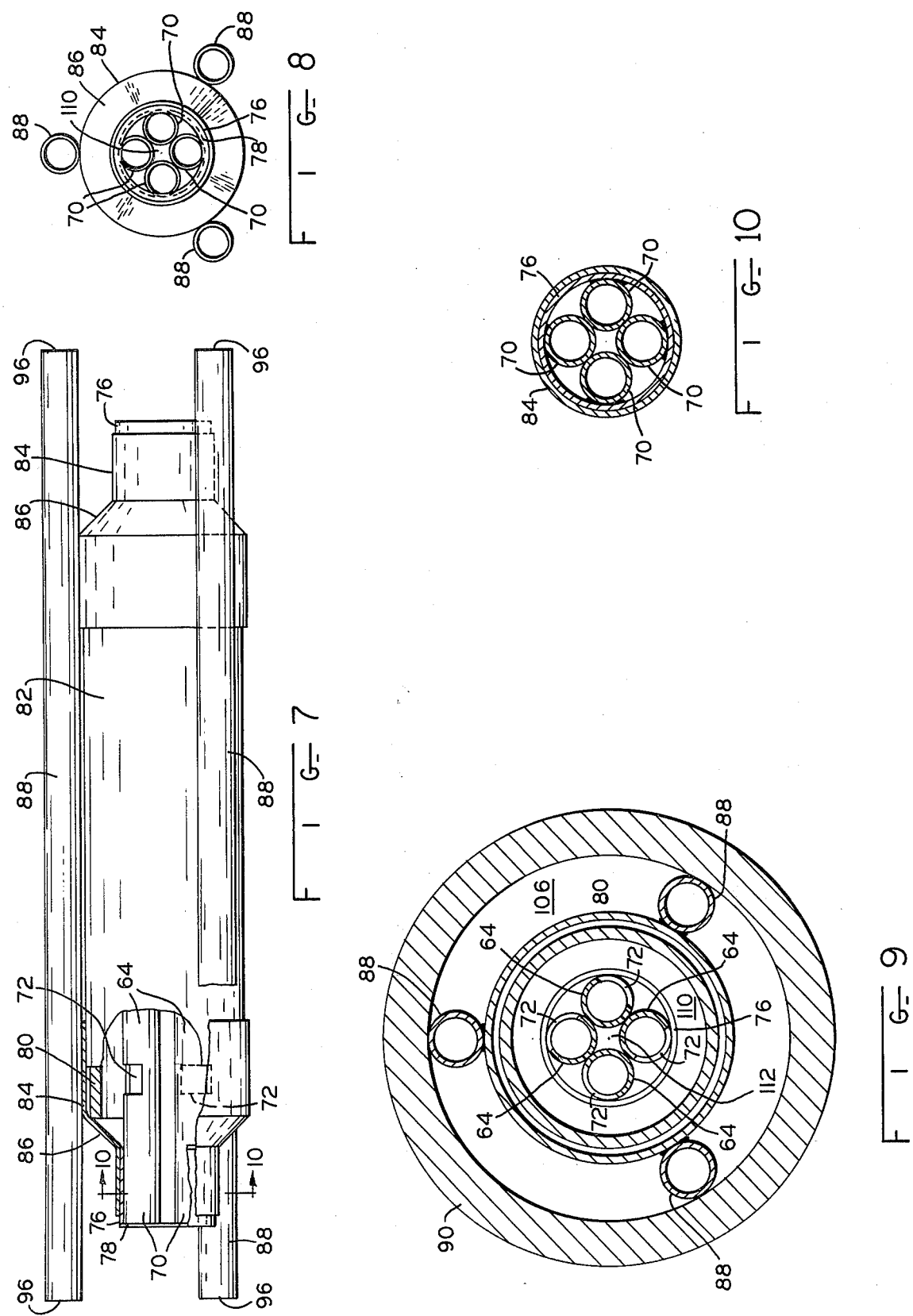

BYPASS WATER CONDITIONER

BACKGROUND OF THE INVENTION

The present invention relates to a device for the magnetic treatment of liquids and in particular to the treatment of water to reduce and prevent the buildup of scale in the pipes and vessels through which the water flows.

A problem which is quite prevalent in systems and apparatus which use large quantities of water, such as boilers, dishwashers, ice machines, and the like, is that of scale buildup on the surfaces which come into contact with the water. This problem is particularly acute in areas where the water has a high mineral content so that it is necessary for the water to be "conditioned" either by chemical action or by magnetic water treatment devices of the general type to which the present invention relates.

Examples of such magnetic treatment devices are disclosed in U.S. Pat. Nos. 3,951,807 and 4,153,559 in the name of Charles H. Sanderson. Basically, such devices comprise an elongated magnet having a multiplicity of longitudinally spaced poles encased in a non-magnetic jacket and concentrically positioned within a casing made of magnetic material, such as galvanized or black iron. The jacketed magnet may be centered by means of a pair of stepped collars secured thereto which, in turn, are centered by means of a pair of tapered inserts. Alternatively, the encased magnet may be centered by resilient sleeves which are wedged between the inner casing and the galvanized intermediate casing, or the inner casing can be centered in recesses in end fittings threadedly secured to the intermediate casing.

Magnetic treatment devices generally of this type are well known and prevent corrosion and the buildup of scale by causing the calcium and other minerals present in hard water to form, instead, a loose slurry which can be removed easily from the system by blowdown or flushing. The effectiveness with which the water is treated depends on the intensity of the magnetic field within the treatment chamber and the effective length of the chamber itself. A further consideration is that the magnetic field produced by the magnet be confined solely to the annular treatment chamber so that all of the available flux will be utilized. An important factor in ensuring this situation is to completely magnetically isolate the magnet from the supporting structure and to complete the magnetic circuit by means of a ferrous casing which surrounds the magnet and is also magnetically insulated therefrom.

In order to effectively treat the water such that the minerals therein will not form as scale on the surfaces of the pipes and vessels with which it comes into contact, it is necessary that the water be subjected to a sufficient amount of magnetic flux as it passes through the water conditioner. The degree of treatment is controlled by varying the strength of the magnet, the cross-sectional area of the annular treatment chamber, and the length of the magnet and treatment chamber. Since various installations, such as boilers, dishwashers, etc., operate at widely varying pressures and flow rates, one size of water conditioner will not be sufficient for all applications. For example, the flow rate in a large boiler will be considerably higher than in a small ice making machine, and if the same water conditioner normally used in the ice making machine were installed in the water supply line for the boiler, the drop in pressure and flow rate would be so great that proper operation of the boiler would not be possible.

In order to properly size water conditioners to the particular installation, it has been necessary to develop a number of models over a wide range of flow capacities. For example, to reduce the pressure drop, the transverse cross-sectional area of the treatment chamber has been increased. Since this results in a larger volume of water flowing through the conditioner per unit time, it is necessary to increase the diameter and, in most cases, the length of the magnet so that the water flowing through the conditioner is subjected to the same magnetic flux density per unit volume. This results in a substantial increase in the size and cost of the unit.

In installations which use all of the supply water without recirculating any of it, the water flows through the conditioner only once and it is, therefore, necessary to subject the water to the maximum level of treatment during its single pass through the conditioner. There are many systems, however, wherein the water is constantly recirculated, such as in swimming pools, vehicle radiators, air conditioning cooling towers, closed circuit boilers for heating systems, and solar panels. In a solar panel, for example, most, if not all, of the water flows through the solar collector and then either through a radiator or holding tank after which it is again pumped through the solar collector. Thus, if the water conditioner is connected in series with the solar collector, the same water is repeatedly flowing through the water conditioner where it is again subjected to the magnetic field. It has been found, however, that once the water is subjected to the proper amount of magnetic flux, it will retain its scale avoiding properties for a period of about thirty-six hours without retreatment. Accordingly, the constant retreating of the water in a system of this type is generally unnecessary. Assuming that the flow rate requirements of the system are low so that a low capacity water conditioner can be utilized, there are no significant disadvantages to continuously retreating the water, even though it is largely unnecessary.

A distinct advantage does arise, however, in the case of large flow capacity systems, such as in the cooling systems of large truck and bus engines. In such a cooling system, large volumes of water are recirculated through the radiator and at relatively low pressures. In order to accommodate the high flow rate of the water and to avoid placing a restriction in the line which would result in an unacceptable pressure drop, it would normally be necessary to utilize a water conditioner wherein the treatment chamber has a large cross-sectional area. It has been found, however, that, in systems wherein the water is continuously recirculated, it is necessary to subject only a small portion of the water to the magnetic field in any one pass through the unit. Unfortunately, prior art water conditioners having a treatment chamber which is sufficiently large to accommodate the flow requirements of a system of this type have magnets which are correspondingly large because they are designed to treat all of the water that flows through the unit. Such units are not only quite expensive, but their size prohibits their being used in certain installations, such as on vehicle engines.

Although units could be designed wherein the size and strength of the magnet is substantially reduced out of proportion with the size of the treatment chamber, this would result in decreasing substantially the magnetic flux density to which the water flowing through the chamber would be subjected. In order to avoid using a very large water conditioner but yet subject the water flowing through the conditioner to the same magnetic flux density which is appropriate for that size of treatment chamber, smaller capacity water conditioners have been connected in bypass lines connected in parallel with the main flow line of the system. This solution has proven to be extremely unsatisfactory, however, because of the difficulty in sizing the conditioner relative to the size of pipe which is to be bypassed. Additionally, there is insufficient space in many installations to accommodate the bypass line, and the additional plumbing joints necessitated by the bypass line increased the locations at which leaks can develop.

A further attempted solution is to place a full capacity water conditioner in a bypass line with a valve which is periodically opened so that the recirculating water in the closed system can be treated. This necessitates periodic maintenance of the system, however, and has proven to be unsatisfactory.

SUMMARY OF THE INVENTION

The above-discussed disadvantages and problems with prior art water conditioners installed in systems of the recirculating type are overcome by the present invention, which provides a bypass chamber contained within the outer casing for the water conditioner and spaced generally radially between at least a portion of the ferromagnetic sleeve encased core and the outer casing. The unit is self-contained in that only the outer casing fluid inlet and outlet need be connected to the water recirculation line. The unit can also easily be sized depending on the frequency with which the water is recirculated by changing the relative cross-sectional areas of the bypass chamber and the treatment chamber surrounded thereby. Thus, once the user knows the flow capacity of his system and the frequency with which the water is recirculated, he can select a single unit to connect in series in the recirculation line without the necessity for constructing a separate bypass line with the inherent problems mentioned previously. The proper relationship between the magnet size and strength and the cross-sectional area of the treatment chamber can be maintained so that the water flowing through the treatment chamber is subjected to the same magnetic flux as previously. Because the water is recirculated, however, even though only a small portion of the water is treated during each pass through the unit, the treated portion of the water will become mixed with the untreated portion so that the net effect is full treatment of all of the water within the closed system after recirculation over an extended period of time.

The water conditioner according to one embodiment of the invention comprises an inner magnetic core comprising an elongated magnet having opposite ends and at least two axially spaced poles wherein the magnet is encased in an inner casing of non-magnetic material. An elongated intermediate casing of magnetic material encircles the magnetic core and is substantially coaxial therewith so as to define therebetween a magnetic treatment chamber having a fluid inlet at one end and a fluid outlet at the other end. The intermediate casing provides a return path for the magnetic field produced by the magnet to confine the magnetic field substantially to the treatment chamber thereby subjecting the water flowing through the treatment chamber to the desired level of magnetic flux. An outer casing encircles the intermediate casing and has a fluid inlet and outlet, and means are provided for spacing the outer casing from the intermediate casing around at least a portion of the periphery of the intermediate casing to form therebetween a bypass chamber. The inlet and outlet of the outer casing are separated from the intermediate casing inlet and outlet to form at least two parallel connected flow paths for liquid through the conditioner, one of which comprises the treatment chamber and the other of which comprises the bypass chamber. This results in a portion of the liquid flowing through the treatment chamber wherein it is treated by the magnetic field, and the remainder flowing through the bypass chamber wherein it is not subjected to the magnetic field.

In an alternative embodiment of the invention, which is particularly adapted for larger flow capacities, a plurality of the magnetic cores are provided wherein each of them includes a tubular inner casing of non-magnetic material having an elongated magnet encased therein. The magnetic cores are parallel and arranged in a bundle and disposed axially in an intermediate casing of magnetic material, and are radially spaced therefrom to form a treatment chamber within the intermediate casing having a fluid inlet at one end and a fluid outlet at the other end. An outer casing encircles the intermediate casing and is radially spaced therefrom to form a bypass chamber having an inlet and an outlet which are separated from the treatment chamber inlet and outlet to form two parallel connected flow paths for the liquid flowing through the conditioner.

BRIEF DESCRIPTION OF THE DRAWINGS

FIG. 1 is a longitudinal sectional view of the magnetic water conditioner according to one embodiment of the present invention;

FIG. 2 is an elevational side view of the conditioner with the outer casing removed;

FIG. 3 is an end view of a device shown in FIG. 2;

FIG. 4 is a sectional view taken along line 4—4 of FIG. 1 and viewed in the direction of the arrows;

FIG. 5 is a sectional view taken along line 5—5 of FIG. 1 and viewed in the direction of the arrows;

FIG. 7 is a longitudinal sectional view of the conditioner of FIG. 6 with the outer casing removed;

FIG. 8 is an end view of the device shown in FIG. 7;

FIG. 9 is a sectional view taken along line 9—9 of FIG. 6 and viewed in the direction of the arrows; and FIG. 10 is a sectional view taken along line 10—10 of FIG. 7 and viewed in the direction of the arrows.

DETAILED DESCRIPTION

Figure 6:
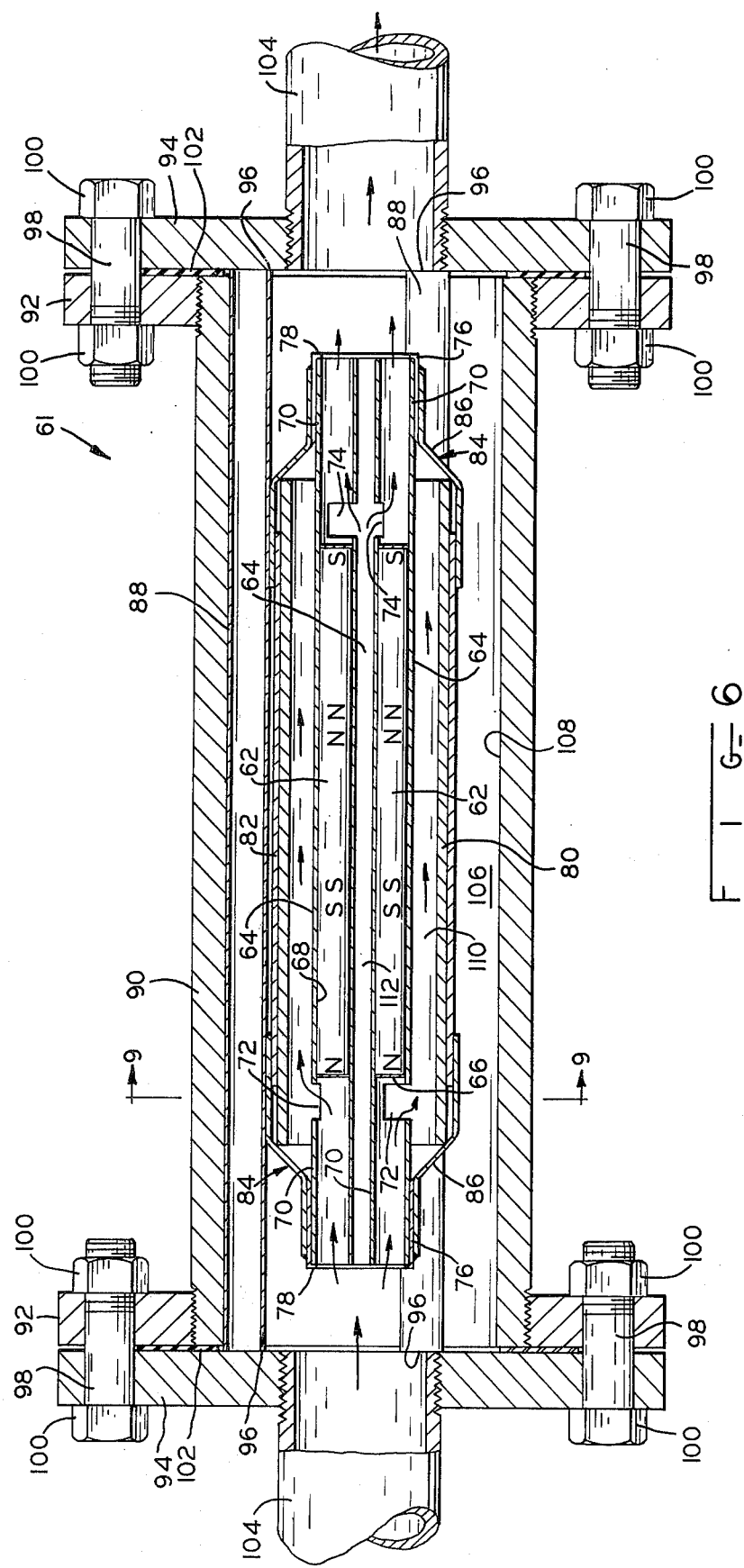
FIG. 6 is a longitudinal sectional view of the magnetic water conditioner according to a second embodiment of the present invention.

Referring now to the drawings, and in particular to FIGS. 1 through 5, the magnetic water conditioner according to one embodiment of the present invention is shown. The water conditioner 10 comprises an elongated, cylindrical magnet 12, preferably having a composition of cobalt, nickel, aluminum, copper and iron, and is magnetized along its longitudinal axis to have a plurality of longitudinally spaced apart poles of alternate North and South polarity represented by the symbols "N" and "S." Magnetic 12 is substantially homogeneous in composition and, in the embodiment illustrated, comprises two magnetic domains extending transversely throughout the magnet and having their magnetic moments oppositely aligned such that opposite North and South poles exist along the length of the magnet. A magnet such as this may be produced by imposing on a bar of magnetic material two longitudinally displaced static magnetic fields of opposite polarity. The number of poles for a particular magnet depends to a great extent on the size of the device and on the intended flow rate capacity of the treatment chamber, and could comprise as few as two poles, for small units. It is preferred that magnet 12 be made of a material having a high energy product and high retentivity and coercivity, such as an Alnico material. Within these desirable constraints, a wide variety of commercially available magnets and magnetic materials may be utilized.

Magnet 12 is encased in an inner casing 14, which is a copper pipe having tubular end portions 16 extending beyond the ends of magnet 12. Magnet 12 is sealed within inner casing 14 by a pair of brass plugs 18, which are soldered in place. Inner casing 14 has a pair of openings 20 and 21 cut in the end portions 16 thereof and offset 180° from each other about the longitudinal axis of inner casing 16.

As mentioned above, inner casing 16 is preferably made of copper, although other types of non-magnetic material, such as brass, could be used. For purposes of the present application, the term "non-magnetic" means materials having a very low magnetic permeability and virtually no ferromagnetic characteristics, such as copper, brass, PVC, nylon and Delrin, for example. "Magnetic" materials are those materials exhibiting high magnetic permeability, such as iron and certain steels.

The magnetic core comprising magnet 12 and inner casing 14 is coaxially received within a tubular, cylindrical intermediate casing 22 of a ferromagnetic material having a high magnetic permeability, such as black iron or galvanized iron or steel. In a preferred embodiment, intermediate casing 22 is a galvanized iron type. Intermediate casing 22 is received within a copper sleeve 24, which functions to protect the outer surface of intermediate casing 22 from corrosion.

A pair of one-half inch to one inch copper reducing couplings 26 comprise axial inner portions 28 in relatively tight engagement with copper sleeve 24, reduced diameter axial outer portions 30 in relatively tight engagement with the outer surface of inner casing end portions 16, and tapered intermediate portions 32. Reducing couplings 26 are slipped over copper sleeve 24 until their tapered sections 32 engage the corners of intermediate casing 22 and are then soldered to copper sleeve 24 and to the end portions 16 of inner casing 14. Reducing couplings 26 serve to center inner casing 14 within the ferrous intermediate casing 22 and prevent casing 22 from shifting axially. By radially spacing inner casing 14 and ferrous intermediate casing 22, a generally annular treatment chamber 34 is formed. The inlet and outlet for treatment chamber 34 are formed by tubular end portions 16 and openings 20 and 21 therein.

Three copper tubes 36 are equidistantly spaced around reducing couplings 26 and are soldered thereto. An outer casing 38 is slipped over spacer tubes 36 and has an inner diameter which is substantially equal to the circle defined by the radially outermost portions of spacer tubes 36. In the event that the diameters of spacer tubes 36 are not sufficiently large to be snugly received within copper pipe 38, arcuate shims (not shown) could be soldered to spacer tubes 36 to take up the dimensional differences. A pair of copper three inch to two inch reducing couplings 40 are slid over outer casing 38 until their tapered portions 42 abut the corners of outer casing 38. Reducing couplings 40 are then soldered to outer casing 38. A pair of two inch barbed copper hose couplings 44 are received within the reduced diameter portions 46 of reducing couplings 40 and are soldered thereto. A bypass chamber 60 is formed between outer casing 38 and copper sleeve 24.

The particular embodiment of the invention shown in FIGS. 1 through 5 is adapted to be connected in the cooling system of a large diesel engine. Rubber hoses 48 leading to or from the radiator of the engine (not shown) are slipped over the barbs 50 of hose couplings 44 and held in place by conventional hose clamps 52. Of course, the invention is not limited to the specific embodiment illustrated, and depending on the type of installation, hose couplings 44 could be replaced by NPT pipe couplings, compression fittings, and the like.

In operation, recirculating water in the vehicle cooling system flows from hose 48 into hose coupling 44, and a portion thereof, such as ten percent, for example, flows through the end portions 16 of inner casing 14, through aperture 20 and into the annular treatment chamber 34 and out through aperture 21 through the other end portion 16 of inner casing 14. Since openings 20 and 21 are offset 180°, the water entering treatment chamber 34 will be caused to make a 180° revolution about the axis. Depending on the flow capacity of the device, additional apertures (not shown) may be cut in the tubular end portions 16, and if only two additionally apertures are so provided, they are preferably aligned diametrically opposite the existing apertures 20 and 21. In this case, apertures 20 and 21 would be displaced only 90° from each other, rather than 180°. The treated water then flows through hose coupling 44 and into the other section of hose 48. The major portion of the water flowing through water conditioner 10 is diverted by reducing couplings 26 and flows in an axial direction through and between spacer tubes 36 in the bypass chamber 60 defined between the outer surface 56 of copper sleeve 24 and the inner surface 58 of outer casing 38. Since the ferrous intermediate casing 22 provides a return path for the magnetic field produced by magnet 12, virtually all of the magnetic flux is confined to treatment chambers 34 and little, if any, magnetic flux will pass through the bypass chamber 60. The untreated water from bypass chamber 60 flows into the hose coupling 44 at the right of FIG. 1 wherein it is mixed with the treated water flowing out of end portion 16. As the water is continuously recirculated, more and more of the untreated water becomes treated until all of the water within the closed system has been subjected to the magnetic field within treatment chambers 34. The arrows in FIG. 1 indicate the flow paths taken by the water.

With reference now to FIGS. 6 through 10, a larger capacity bypass water conditioner 61 according to the present invention will be described. Four elongated magnets 62 are received within respective copper inner casings 64, and are sealed therein by means of thin brass plugs 66, which are soldered to the inner surfaces 68 of inner casings 64. Magnets 62 are made of the same material as magnet 12 in the embodiment of FIGS. 1-5, but comprises three magnetic domains wherein the South and North poles of the center domain are aligned with the South and North poles, respectively, of the outer domains.

Inner casings 64, which are made of one-half inch copper tubing, include end portions 70 extending beyond the ends of magnet 62 and having inlet apertures 72 and outlet apertures 74. Inlet apertures 72 are arranged as illustrated in FIG. 9, and their corresponding outlet apertures 74 are offset by 180° about the longitudinal axis. It will be seen that none of the inlets 72 or outlets 74 are in direct opposition to each other, thereby reducing turbulence as the water exits from openings 72 and 74. Inner casings 64 are arranged in a stable bundle as illustrated in FIG. 9, and a pair of copper sleeves 76 having inner diameters substantially equal to the circle defined by the radially outermost portions of inner casings 64 are slipped over the opposite ends of the bundle. The ends 78 of sleeve 76 are deformed inwardly to form a step which holds the bundle of inner casings 64 in place, and sleeves 76 are soldered to casings 64 as illustrated in FIG. 10.

The bundle of magnetic cores comprising magnets 62 and inner casings 64 are centered within an intermediate casing 80 comprising a two inch galvanized iron pipe. Ferrous intermediate casing 80 is received within a copper sleeve 82, and a pair of one and one-half inch to two and one-half inch copper reducing couplings 84 are slipped over copper sleeve 82 until their tapered intermediate portions 86 engage the corners of ferrous intermediate casing 80. Reducing couplings 84 are soldered to copper sleeve 82 and to end sleeve 76. Reducing couplings 84 serve to center the bundle of magnet cores within ferrous intermediate casing 80 and prevent intermediate casing 80 from shifting axially.

Copper spacer tubes 88, which are equidistantly spaced, are soldered to reducing couplings 84. This unit is then slipped into a four inch galvanized pipe 90, which has an inner diameter substantially equal to the circle defined by the radially outermost portions of spacer tubes 88. A pair of four by nine steel companion flanges 92 are threaded on the ends of four inch galvanized pipe 90, and a pair of two by nine reducing companion flanges 94, which abut the ends 96 of spacer tubes 88, are connected to flanges 92 by bolts 98 and nuts 100. A pair of annular, resilient plastic seals 102 are compressed between flanges 92 and 94 when nuts 100 are tightened on bolts 98 to seal the interior of pipe 90. Two inch NPT pipes 104 are threaded into reducing flanges 94. Pipes 104 are part of the recirculation line for the system in which the water conditioner 61 is installed, such as recirculating-type boiler, for example.

In operation, water, or other liquid, flows through the conditioner 61 in a manner indicated by the arrows in FIG. 6. Water flows from pipe 104 into the interior of galvanized pipe 90, and from there is split into two parallel flow paths, one through the bypass chamber 106 formed between copper sleeve 82 and the inner surface 108 of galvanized pipe 90, and the other within the ferrous intermediate casing 80, which forms the treatment chamber 110 between it and the inner casings 64. The water flowing through the treatment chamber 110 flows initially through the end portions 76 of inner casings 64 and in the space 112 between inner casings 64, through openings 72, around inner casings 64, through outlet openings 74, through the right hand end portions 70 and out through pipe 104. As the water flows through the treatment chamber 110, it is subjected to the magnetic field produced by magnets 62 in a well known manner. The remainder of the water is diverted around reducing couplings 84 and copper sleeve 82 and through the bypass chamber 106. At the right end of the bypass chamber 106 as viewed in FIG. 6, the untreated water becomes mixed with the treated water exiting from inner casing 70 and flows out through pipe 104. As the water is continuously recirculated, more and more of the untreated water flows through the treatment chamber 110 until nearly all of the water within the closed system has been subjected to the magnetic field present in the treatment chamber 110.

If a unit of even larger capacity is desired, more of the magnetic cores comprising magnets 62 and inner casings 64 can be arranged in a bundle, or in a plurality of bundles. In in a bundle in a large galvanized pipe. In such a case, the bypass chamber would comprise the space within the larger pipe between the larger encased bundles and the treatment chamber would be in the form of a plurality of chambers defined by the respective ferrous casings 82.

Although dimensions for the various elements of the water conditioners have been given, they are only exemplary and will vary depending on the size and capacity of the unit.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A water conditioner comprising:
   a magnetic core comprising an elongated magnet having opposite ends and at least two axially spaced poles encased in an inner casing of nonmagnetic material,
   an elongated intermediate casing of magnetic material encircling said magnetic core and being substantially coaxial therewith,
   means for radially spacing said magnetic core and said intermediate casing such that they form a treatment chamber therebetween, said treatment chamber having a fluid inlet at one end and a fluid outlet at the other end thereof,
   said intermediate casing providing a return path for the magnetic field produced by said magnet to confine the magnetic field produced by the magnet generally to the treatment chamber,
   an outer casing encircling said intermediate casing and having an inlet and an outlet,
   means for spacing said outer casing from said intermediate casing around at least a portion of the periphery of said intermediate casing to form therebetween a bypass chamber, said outer casing, inlet and outlet being separated from the intermediate casing inlet and outlet to form at least two parallel connected flow paths for liquid flowing through the conditioner, one of the flow paths comprising the treatment chamber and the other flow path comprising the bypass chamber,
   whereby the portion of the liquid flowing through the treatment chamber will be treated by the magnetic field and the remainder of the liquid which flows through the bypass chamber is not subjected to the magnetic field.

2. The water conditioner of claim 1 wherein said outer casing inlet and outlet are axially spaced from the treatment chamber inlet and outlet, respectively.

3. The water conditioner of claim 1 wherein said means for radially spacing said magnetic core and said intermediate casing comprises fittings disposed on the respective ends of said intermediate casing and having fluid openings defining the fluid inlet and outlet of said treatment chamber, said fluid openings being spaced axially inward of the outer casing inlet and outlet.

4. The water conditioner of claim 3 wherein said inner casing comprises a tubular member having end portions which extend beyond opposite ends of said magnet, and said fittings are tapered reducing fittings which engage the tubular end portions of said inner casing to thereby center said inner casing in said intermediate casing, and said inner casing includes openings in the opposite end portions in communication with said treatment chamber.

5. The water conditioner of claim 1 wherein said intermediate casing is centered in said outer casing and said bypass and treatment chambers are each annular.

6. The water conditioner of claim 1 wherein said means for spacing said intermediate casing comprises a plurality of open tubular spacers positioned between said outer and intermediate casings, said spacers being generally parallel with said intermediate and outer casings.

7. The water conditioner of claim 1 including a plurality of said magnetic cores received in said intermediate casing, each core having an elongated magnet encased in a tubular inner casing.

8. A water conditioner comprising:
a plurality of magnetic cores each comprising a tubular inner casing made of non-magnetic material having an axially positioned elongated magnet encased therein,
said magnetic cores being parallel and arranged in a bundle and being disposed axially in an intermediate casing of magnetic material, said bundle of magnetic cores being radially spaced from said intermediate casing to form a treatment chamber within said intermediate casing, said treatment chamber having a fluid inlet at one end and a fluid outlet at the other end thereof,
said intermediate casing providing a return path for the magnetic fields produced by said magnets to confine the magnetic fields generally to the treatment chamber,
an outer casing encircling said intermediate casing,
means for radially spacing said outer casing from said intermediate casing around at least a portion of the periphery of said intermediate casing to form therebetween a bypass chamber, said bypass chamber having an inlet and an outlet being separated from said treatment chamber inlet and outlet to form at least two parallel connected flow paths for liquid flowing through the conditioner, one of said flow paths comprising the treatment chamber and the other flow path comprising the bypass chamber,
whereby the portion of the liquid flowing through the treatment chamber is treated by the magnetic field and the remainder which flows through the bypass chamber is not subjected to the magnetic field.

9. The water conditioner of claim 8 wherein there are at least three said magnetic cores, and the bypass chamber inlet is axially spaced from the treatment chamber inlet.

10. The water conditioner of claim 8 wherein there are at least three said magnetic cores, said inner casing comprises a tubular member having end portions which extend beyond opposite ends of said magnet, and said inner casings are centered in said intermediate casing by a reducing fitting which engages said intermediate casing and have the respective opposite end portions of the inner casings received therein.

11. The water conditioner of claim 8 wherein said means for radially spacing said outer casing comprises a plurality of open tubular spacers positioned between said outer and intermediate casings, said spacers being generally parallel with said outer and intermediate casings.

12. The water conditioner of claim 8 wherein said magnets each have at least two magnetic domains, wherein each said domain comprises a North pole and a South pole.

* * * * *